United States Patent [19]

Mochizuki et al.

[11] Patent Number: 4,812,034
[45] Date of Patent: Mar. 14, 1989

[54] PROJECTION TYPE LIQUID CRYSTAL DISPLAY DEVICE

[75] Inventors: Akihiro Mochizuki; Masayuki Iwasaki, both of Atsugi; Yasuo Yamagishi, Zama; Kasumi Ikegami, Sagamihara; Hiroyuki Gondo, Kawasaki; Hisashi Yamaguchi, Atsugi, all of Japan

[73] Assignee: Fujitsu Limited, Kawasaki, Japan

[21] Appl. No.: 139,164

[22] Filed: Dec. 21, 1987

Related U.S. Application Data

[63] Continuation of Ser. No. 832,897, Feb. 26, 1986, abandoned.

[30] Foreign Application Priority Data

Feb. 28, 1985 [JP] Japan .................. 60-037654

[51] Int. Cl.$^4$ .................................. G03B 21/00
[52] U.S. Cl. ........................... 383/122; 353/121
[58] Field of Search ............... 350/330, 331, 333, 334; 353/121, 120, 122, 84, 250

[56] References Cited

U.S. PATENT DOCUMENTS

| | | | |
|---|---|---|---|
| 3,836,243 | 9/1974 | Melchior | 353/122 |
| 3,895,866 | 7/1975 | Quervain et al. | 353/120 X |
| 3,922,667 | 11/1975 | Veda | 350/333 X |
| 4,060,316 | 11/1977 | Pollack | 353/122 X |
| 4,222,641 | 9/1980 | Stolov | 353/88 X |
| 4,368,963 | 1/1983 | Stolov | 353/122 X |

FOREIGN PATENT DOCUMENTS

| | | |
|---|---|---|
| 59-19924 | 2/1984 | Japan . |
| 59-37533 | 3/1984 | Japan . |
| 59-131740 | 9/1984 | Japan . |
| 59-151236 | 10/1984 | Japan . |
| 59-151235 | 10/1984 | Japan . |

OTHER PUBLICATIONS

IBM. J. Res. Develop., vol. 26, No. 2, pp. 177-185 (1982).
Hughes, SID 79 Digest, pp. 22-23 (1979).

Primary Examiner—Harry N. Haroian
Attorney, Agent, or Firm—Staas & Halsey

[57] ABSTRACT

A cholesteric-nematic phase transition type liquid crystal with positive dielectric anisotropy is used in a projection type liquid crystal display device. This allows a bright and high information contents display with a compact, light, and low cost device and allows machinery input and thus simultaneous display at remote places, such as remote conference rooms or remote notice boards, in bright locations.

4 Claims, 5 Drawing Sheets

LIGHT → CONDENSED (BRIGHT)

NEMATIC PHASE
(TRANSMISSION)

LIGHT → NOT CONDENSED (DARK)

CHOLESTERIC PHASE
(SCATTERING)

PROJECTION TYPE LIQUID CRYSTAL DISPLAY DEVICE

This is a continuation of application Ser. No. 832,897 filed on Feb. 16, 1986 now abandoned.

BACKGROUND OF THE INVENTION

1. Field of the Invention

The present invention relates to a projection type liquid crystal display device. More particularly, it relates to such a device which is capable of writing and erasing an image only by application of voltage and of displaying the information from a remote place and which is compact and produces a bright display image at a projection area even in bright surroundings. Such a display device is suitable to be used for conferences, education, and public notices such as in theaters, music halls, department stores, railway stations, airport lobbies, etc.

2. Description of the Related Art

Heretofore, projection type cathode ray tubes (CRT), laser light writing projection type liquid crystal display devices, and CRT writing projection type liquid crystal display devices have been used as projection type display devices for relatively bright rooms (see IBM. J. Res. Develop. Vol. 26, No. 2, pp. 177-185 (1982); Hughes, SID 79 Digest pp. 22-23 (1979). These devices are of the scanning type. Also known are overhead projectors (OHP) which project an original directly onto a screen.

Projection type CRT's have projection devices built in so that an image formed on a CRT display surface is projected onto a screen. Laser light writing projection type liquid crystal display devices project onto a screen an image formed in a liquid crystal panel by changing alignment states thereof by heat from the laser light. CRT writing projection type liquid crystal display devices comprise a liquid crystal panel comprising a laminate of a liquid crystal layer and a photoconductive layer between electrodes. A CRT irradiates the photoconductive layer with an image like light to change the voltage applied to the liquid crystal layer so that an image corresponding to the irradiated light is formed in the liquid crystal layer, which image is projected onto a screen.

OHP's simply project an image formed on a transparent or translucent sheet with an opaque colorant onto a screen by white light.

Projection type CRT's are essentially a light emission type and therefore cannot use a light source for projection having a large quantity of light, such as a halogen lamp, resulting in a dark projected image on a screen. Since it projects an image formed on an image face of a CRT, the hole device becomes large so that it ordinarily has to be used in a fixed place, and is not portable.

Laser light writing projection type liquid crystal display devices have advantages that light sources having a large quantity of light can be used for projection and both reflection and transmission type projections can be done so that the projected image is bright. These devices however use writing laser light providing heat to a liquid crystal to thermally cause phase transition and form an image, by which a display is attained. This mechanism necessitates large electric power applied to the liquid crystal. Further, because the heat necessary for causing the phase transition of a liquid crystal is provided by light, the output of laser light must also be large and a light source such as an argon laser is necessary, which makes it impossible to make the device compact.

CRT writing projection type liquid crystal display devices have a large light source, though smaller than that of the above laser light writing devices. Since an image is transferred from an faceplane of a CRT to a liquid crystal panel, the faceplane of the CRT or the original image cannot be made large. As a result, the image must be magnified by providing a large distance from the liquid crystal panel to a projection screen and therefore, the brightness of the image on the screen is not sufficient.

In contrast, projection type liquid crystal display devices in which writing is conducted only by application of voltage enable remarkable compactness and light weight and promise reduction of production costs (see, for example, Japanese Unexamined Utility Model Publication (Kokai) Nos. 59-131740, 59-151235, and 59-151236 and Japanese Unexamined Patent Publication (Kokai) Nos. 59-19924 and 59-37533). However, only dynamic scattering mode (DSM) or twisted nematic (TN) type liquid crystal display devices are conventionally used. They cannot provide a display having high information contents and do not have sufficient information for use in conferences, etc. Although a TN type liquid crystal display device with an about 640×200 dot display has become available recently, TN type devices must have two polarizers, which remarkably reduces the quantity of light transmitted through the liquid crystal panel and makes a projected image dark.

OHP's have been widely used in conferences of small numbers of participants since they have advantages of light weight, compactness and low cost, can display an original image directly on a screen, and allow writing on the original sheet in situ with an oil pen. Further, the original sheet usually is of an A4 size, so not that large a magnification is necessary and the image on the screen is bright enough to see even in a bright room. However, to display with an OHP, preparation of OHP sheets is necessary and fine lettering is required depending on the nature of the conference, etc. OHP sheets once made cannot be modified during display. If there are a large number of OHP sheets, carrying them and changing sheets in the OHP are troublesome.

Recently "electronic conference systems" have been proposed and sold, enabling conferences between remote places through telephone cables or radio systems. These use devices capable of simultaneous display in each conference room, that is, display devices which can display, at all conference rooms, an image that is under discussion in any one conference room in real time by means of some image transmitting medium. For these applications, OHP's cannot be used. Projection type CRT's can be used, but have a drawback of dark images. Moreover, if a projection type CRT or a laser light writing projection type LCD is used, special conference rooms must be prepared, since the devices are large in size and heavy in weight.

Thus, projection type display devices which have the facility and universality of OHP's and are capable of transferring and receiving images by means of telephone lines, etc. are desired.

Further, if compact projection type display devices capable of providing bright, large capacity displays become available, they would be useful in many applications, e.g., as notice boards at airport lobbies, railway stations, theaters, etc. and as educational instruments.

SUMMARY OF THE INVENTION

The above and other objects are attained according to the present invention by using, in a projection type liquid crystal display device, a liquid crystal panel containing a cholesteric-nematic-phase transition type liquid crystal with positive dielectric anisotropy.

The liquid crystal pannel typically-comprises: a first transparent substrate; a second transparent substrate; a first transparent electrode formed on said first transparent substrate of the liquid crystal contacting side; a second transparent electrode formed on said second transparent substrate of the liquid crystal contacting side; said first and second substrates are assembled such that said first transparent electrode and said second transparent electrode are arranged in the form of a simple X-Y matrix and confront each other, to form a space for filling the liquid crystal, thereby forming a liquid crystal panel together with a spacer provided therebetween; and a cholesteric-nematic phase transition type liquid crystal with positive dielectric anisotropy sealed between the transparent plates and the spacer.

This display device may have various types of input means and optical or projection systems.

This display device may be used in conjunction with a remote communication system, or an electronic conference system enabling conferences between remote places through telephone cables or radio systems, wherein a projection type liquid crystal display device is used for display in each place, the projection type liquid crystal display device comprising: a liquid crystal panel containing a cholesteric-nematic phase transition type liquid crystal with positive dielectric anisotropy and means for driving said liquid crystal panel to form an image thereon; whereby said image can be projected onto a projection area by means of an optical system.

DESCRIPTION OF THE PREFERRED EMBODIMENTS

Figure 1:
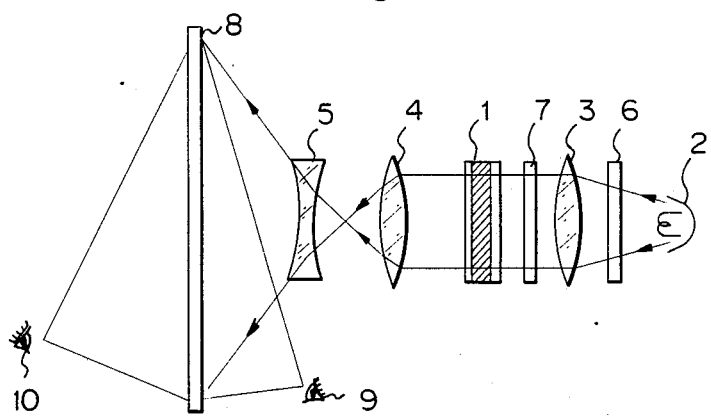
FIG. 1 is a schematic side view of a system of a projection type liquid crystal display device according to the present invention.

FIG. 1 illustrates an example of a projection type liquid crystal display device according to the present invention. In FIG. 1, reference numeral 1 denotes a liquid crystal panel, 2 a light source, 3, 4, and 5 lenses, 6 and 7 filters, 8 a screen, and 9 and 10 human viewers. An image formed on the liquid crystal panel 1 is projected onto the screen 8 by an optical system composed of the light source 2, the lenses 3 to 5, the filters 6 and 7, and the like to effect a display.

Figure 2A:
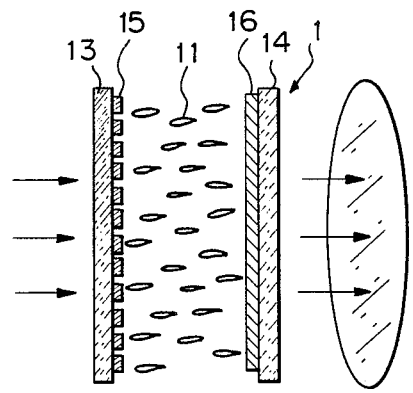
FIGS. 2A and 2B are sectional side views of a liquid crystal panel in which the liquid crystal is in the nematic and cholesteric phases respectively.
Figure 2B:
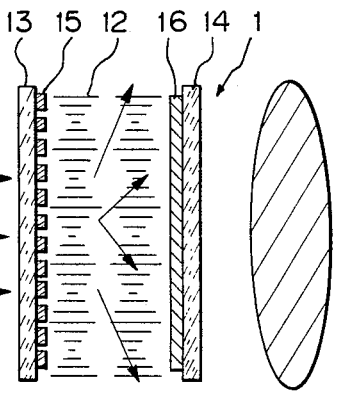

Referring to FIGS. 2A and 2B, a liquid crystal panel 1 comprises a cholesteric-nematic phase transition type liquid crystal with positive dielectric anisotropy 11 or 12 sealed between transparent substrates 13 and 14 having transparent electrodes 15 and 16 respectively arranged in the form of a simple X-Y matrix. The electrodes 15 and 16 may be constituted from segments. Referring to FIG. 2A, if the liquid crystal 11 is nematic phase, the liquid crystal 11 allows incident light to pass through it so that light from a light source 2 is condensed by an optical system onto a screen 8 and the screen 8 becomes bright. In contrast, referring to FIG. 2B, if the liquid crystal 12 is cholesteric phase, the liquid crystal 12 scatters incident light so that light from a light source 2 is not condensed onto a screen 8 and the screen 8 becomes remarkably dark. Therefore, if portions of nematic and cholesteric phases are selectively (or in the form of an image) formed in the liquid crystal panel 1 by appropriately driving the electrodes 15 and 16, bright and dark portions are formed on the screen 8, which portions correspond to the above selective phase portions of the liquid crystal 11 and 12. Thus, an image formed on the liquid crystal panel 1 is projected onto the screen 8 and the display of a projected image is attained. This liquid crystal display using the transmission/bright-scattering/dark relationship or phenomenon provides advantages in that a bright display as a whole is possible and contrast is high.

Any liquid crystal which exhibits cholesteric nematic phase transition and has positive dielectric anisotropy can be used in a projection type liquid crystal display device according to the present invention. Generally, such a liquid crystal is a mixture of a nematic liquid crystal and a cholesteric or chiral nematic liquid crystal. A mixture of a nematic liquid crystal selected from the group consisting of ethane system, ester-system, biphenyl-system and bicyclohexane-system nematic liquid crystals and a mixture thereof with a chiral nematic liquid crystal, which exhibits phase transition and has a helical pitch of near 0.8 μm, is preferably used. The shorter the helical pitch, the faster the driving speed but the higher the driving voltage. On the other hand the longer the spiral pitch, the slower the driving speed but the lower the driving voltage. An example of an ethane-system nematic liquid crystal is

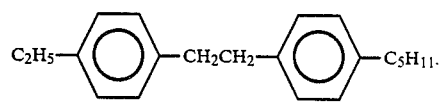

An example of an ester-system liquid crystal is

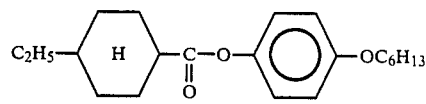

An example of a biphenyle-system liquid crystal is

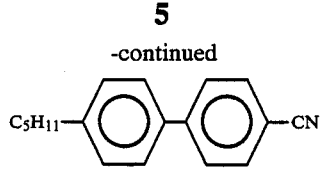

An example of a bicyclohexane-system liquid crystal is

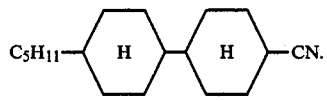

A mixture of ethane-system nematic and chiral nematic liquid crystals is the most preferable. Further details can be seen in the specifications of Japanese Patent Application Nos. 59-35114, 59-107404, 59-180633, etc.

A preferred method for driving a liquid crystal panel in order to write an image therein is as follows. Details can be seen in Japanese Patent Application No. 59-111414.

Figure 3:
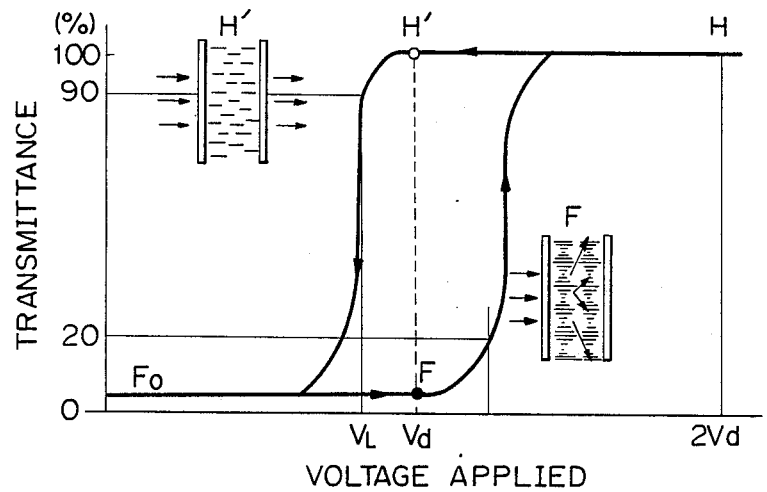
FIG. 3 is a graph of the transmittance of a phase transition type liquid crystal according to the present invention in relation to voltage applied to the liquid crystal.

First, referring to FIG. 3, a voltage $2V_d$ is applied between each signal electrode (X electrode) and each scanning electrode (Y electrode) to change the entire liquid crystal into an initial state or H state. In this state, the liquid crystal is in the nematic phase and all image elements are transparent, so that about 90% of light from a light source is condensed by lenses and reaches a screen. Although about 10% of light is absorbed by a liquid crystal panel during passage therethrough, almost all of that is absorbed by transparent electrodes such as ITO (indium tin oxide) and absorption or scattering by the liquid crystal is almost negligible. Therefore, if transparent conductive materials such as ITO are improved in the future, brightness of an image on a screen is expected to become higher. Next, the voltage applied to image elements in the liquid crystal panel where writing is to be conducted is reduced below $V_L$, normally zero, for several milliseconds or 2 to 8 ms. At these image elements, the liquid crystal becomes the cholesteric phase, $F_0$ state. To image elements in the liquid crystal panel where writing is not to be conducted, a voltage of above $V_L$, normally 2 Vd or Vd, is still applied. At these image elements, the liquid crystal is in the nematic phase, H or H' state. After a voltage of zero or below $V_L$ is applied to the image elements to be written for several milliseconds, a voltage of Vd is applied to all image elements. The above operation is repeated on every scanning line to conduct writing in the liquid crystal panel. Here, when the voltage of Vd is applied to every image element, the image elements where the liquid crystal was the cholesteric phase or $F_0$ state just before becomes the cholesteric phase or F state, i.e., a state that light is scattered there, and the image elements where the liquid crystal was the nematic phase or H or H' state just before becomes the nematic phase or H' state, i.e., a state where light transmits. After that, these two states, i.e., F and H' states, are maintained stably if application of the voltage Vd thereto is continued. Thus, a display is established.

Figure 4:
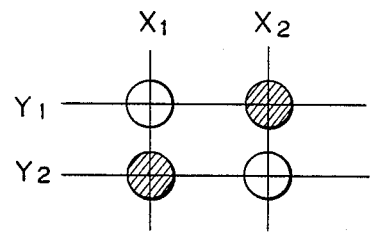
FIG. 4 is a plan view of an arrangement of a 2×2 simple X-Y matrix of electrodes.
Figure 5:
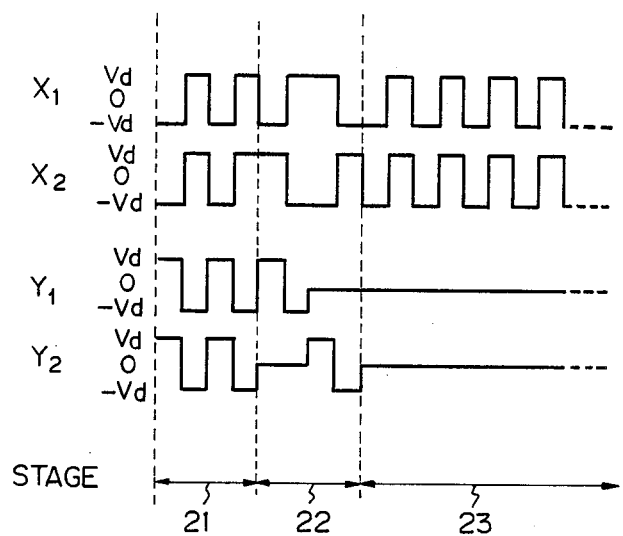
FIG. 5 is a diagram of the driving voltage for each electrode in FIG. 4.

FIGS. 4 and 5 illustrate an example of a 2×2 simple X-Y matrix arrangement of electrodes and a voltage waveform diagram for driving the electrodes. In FIG. 4, the electrodes $X_1$ and $X_2$ are signal electrodes and the electrodes $Y_1$ and $Y_2$ are scanning electrodes. The crossed portions, or image elements, $(X_1, Y_1)$ and $(X_2, Y_2)$ are expected not to be written and the crossed portions, or image elements, $(X_1, Y_2)$ and $(X_2, Y_1)$ are expected to be written. Referring to FIGS. 3 to 5, during an initializing stage 21, a voltage of 2 Vd is applied to all image elements to place them in an H state or nematic phase. In a writing stage 22, application of voltage to the image elements $(X_1, Y_2)$ and $(X_2, Y_1)$ is stopped for a while, e.g., a time period of two pulses in FIG. 5, while a voltage of 2 Vd or Vd is applied to the image elements $(X_1, Y_1)$ and $(X_2, Y_2)$. By stopping the application of a voltage, the image elements $(X_1, Y_2)$ and $(X_1, Y_2)$ become the $F_0$ state or cholesteric phase. The image elements $(X_1, Y_1)$ and $(X_2, Y_2)$ continue in the nematic phase or H or H' state. During the dynamic memory stage 23, by application of a voltage of Vd to all image elements, the image elements $(X_1, Y_2)$ and $(X_2, Y_1)$ become and continue to be in the F state or cholesteric phase, and the image elements $(X_1, Y_1)$ and $(X_2, Y_2)$ become and continue to be in the H' state or nematic phase. Thus, by the application of voltages having waveforms as in FIG. 5, a writing image comprising the image elements $(X_1, Y_2)$ and $(X_2, Y_1)$ is formed in a liquid crystal panel.

If the above type of driving method is applied to a liquid crystal panel, the number of scanning lines is not limited. When a liquid crystal is in a light scattering state, the liquid crystal is in the cholesteric phase having a helical structure between electrodes. The helical axes thereof are perpendicular or almost perpendicular to incident light so that the incident light is scattered by the helical structure of the liquid crystal of the chloesteric phase. As a result, light is not condensed by the optical system and the corresponding portion on a screen becomes remarkably dark, in contrast to the other portion on the screen where light is condensed. This driving method allows partial rewriting of an image. Moreover, this driving method allows reversion between the cholesteric phase and nematic phase, that is, for example, the letter portion is displayed by the nematic phase (transmission or bright) and the background is displayed by the cholesteric phase (scattering or dark), and also allows negative-positive reversion only in a desired portion of the display. Further, by making Red, Green and Blue (RGB) filter layers, which have been used in conventional color television devices, at every image element, a projection display with full color is possible. By making active elements in a liquid crystal panel, a moving picture display is possible.

Although the above driving method is preferred, the present invention is not limited thereto. The other driving methods, for example, a refresh driving method which the inventors also provided and in which an image is maintained by periodically rewriting the image, or a conventional driving method in which the display is kept at an applied voltage of zero, may be used. These driving methods are also seen in the specifications before mentioned or of Japanese Patent Application No. 58-16963.

Referring again to FIG. 1, a latent image formed in the liquid crystal panel 1 is projected onto the screen 8 by modifying light from the light source 2 to parallel rays by the convex lens 3, passing them through the liquid crystal panel 1, condensing them by the convex lens 4, and then expanding them by the concave lens 5 onto the screen 8. Depending on types of the screen 8, an image on the screen 8 can be seen from either the front side 9 or back side 10 of the screen 8. In FIG. 1, the reference numerals 6 and 7 denote filters, where one or both of an IR cutting cold filter for preventing penetration of heat into the liquid crystal panel 1 and an UV cutting filter for preventing photodecomposition of the liquid crystal in the panel 1 are preferably inserted.

Figure 6:
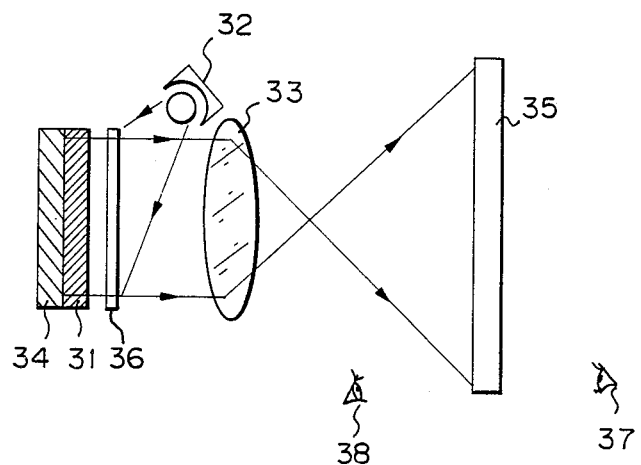
FIG. 6 is a perspective side view of a reflection projection type liquid crystal display device according to the present invention.

The optical system may be varied and is not limited to the above one. Further, the optical system may be the reflection projection type. FIG. 6 illustrates an example of such an optical system. In FIG. 6, reference numeral 31 denotes a liquid crystal panel, 32 a light source, 33 a lens, 34 a mirror, 35 a screen, 36 a filter, and 37 and 38 viewers. In this system, generally, light from the light source 32 is incident into the liquid crystal panel 31, passes through the liquid crystal panel 31, is reflected by the mirror 34, again passes through the liquid crystal panel 31 in the reverse direction, and is condensed onto the screen 35 by the condensing lens 33. If the liquid crystal panel 31 has image elements where the liquid crystal is in the cholesteric phase, the light does not pass through the liquid crystal panel there and the light is not condensed to the corresponding portions on the screen 35 so that an image composed of bright and dark portions is formed on the screen 35.

Figure 7:
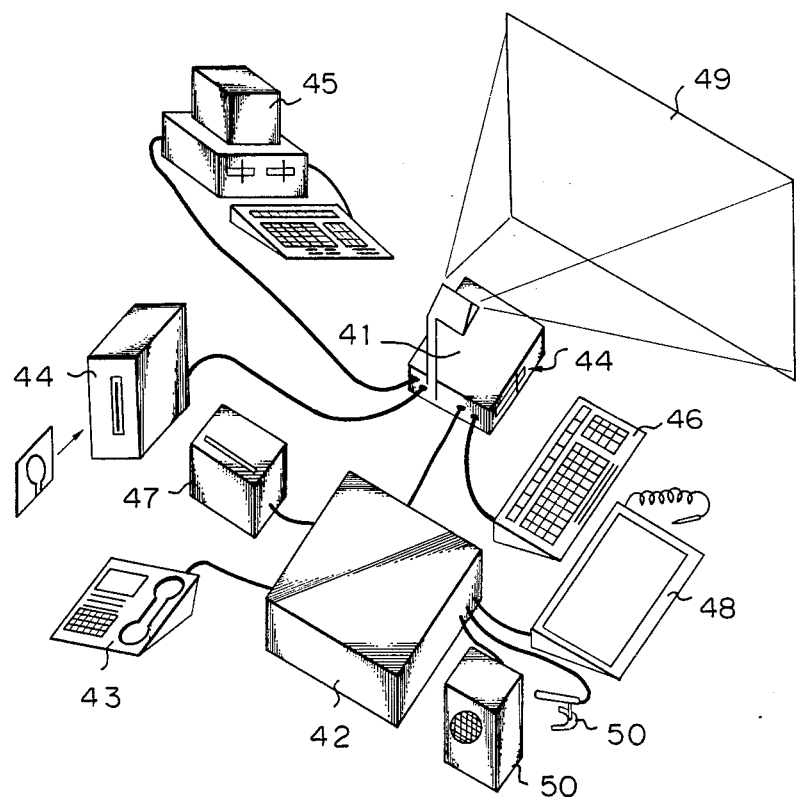
FIG. 7 is a schematic view of a liquid crystal display device with various input devices and an adapter.

As described before, a projection type liquid crystal display device according to the present invention can be driven by application of voltage alone. Therefore, for example, as seen in FIG. 7, a main display device 41 may be provided with an adapter 42 for remote communication such as a radio transmitting unit or an acoustic coupler 43 so that the contents of the display can be transmitted and received between remote places by means of telephone lines etc., whereby simultaneous display at remote places is enabled and a display device suitable for electronic conference systems is provided. By providing the display device with a floppy disc unit 44, indirect mechanical input from a separate word processor, microcomputer, etc. is possible and a large quantity of display data can be stored making storing and carrying convenient. Of course, direct mechanical input or display by a built-in word processor, microcomputer 45, etc. is also possible. In such cases, a keyboard 46 may be provided. If a keyboard 46 is provided, the display conducted by a floppy disc, etc., can be modified, or all or a part of the display may be presented with positive-negative reversion. By providing the display device with a character reader 47 or a means for hand writing input 48, display can be conducted by handwritten drafts, etc. In FIG. 7, reference numeral 49 denotes a screen and 50 an audio instrument such as a microphone or a loud speaker.

A projection type liquid crystal display device according to the present invention has advantages of portability and low cost since it is basically the same size as or smaller than a conventional OHP. This, however, does not exclude using the device for a large scale display by increasing the information contents of the liquid crystal panel.

Figure 8:
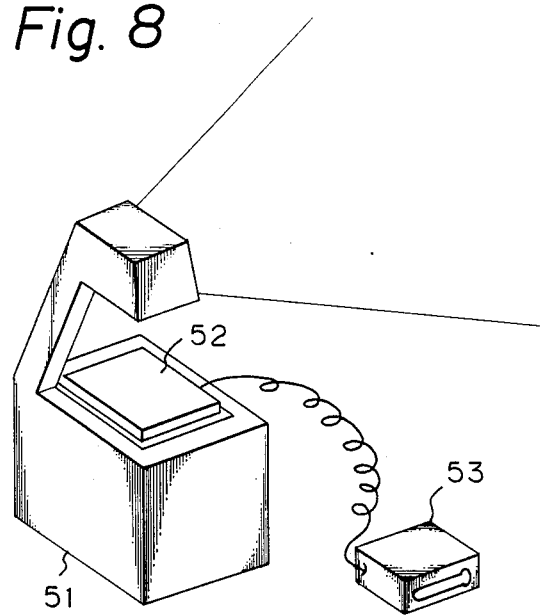
FIG. 8 is a perspective view of an OHP with a liquid crystal panel according to the present invention.

FIG. 8 illustrates a projection type liquid crystal display according to the present invention using an OHP or the like. A main OHP 51 may be a conventional OHP or a similar one. If a liquid crystal panel 52 is placed at an original setting portion of the main OHP 51 in place of a draft paper and driven, e.g., by a driving unit 53 such as a floppy disc unit 53, an image is formed on the liquid crystal panel 52 in accordance with information stored in the floppy disc and projected onto a screen. A liquid crystal panel 52 may be incorporated into or removably attached to the main OHP 51.

Figure 9:
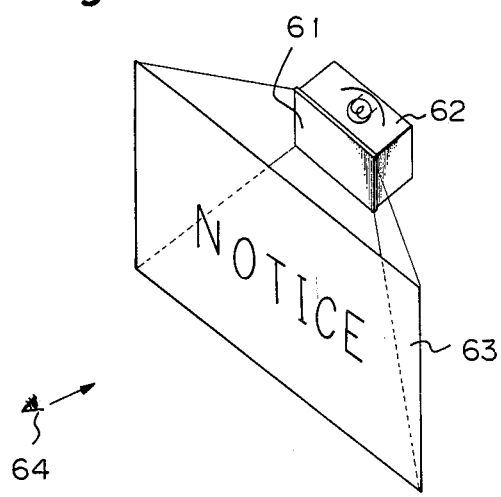
FIG. 9 is a perspective view of a notice board using a liquid crystal display device according to the present invention.

FIG. 9 illustrates a public notice board, useful, for example, at an airport lobby. In FIG. 9, reference numeral 61 denotes a liquid crystal panel, 62 a box including a light source and an optical system for projection, and 63 a screen. Projection is made to the screen 63, for example, of about 100 inch size, from the back of the screen 63 to a viewer 64. This display device can be compact but allows bright display with a large quantity of information and easy display or modification of an image in different places or even by remote control.

EXAMPLE

Glass substrates with a transparent electrode (ITO), having a size of 160 mm × 130 mm × 1.1 mm, were patterned by photolithography to form X and Y electrodes. These were assembled to form a liquid crystal panel, together with glass fiber having a diameter of 9 μm provided therebetween as a spacer into the panel, a cholesteric-nematic phase transition type liquid crystal composed of a mixture of mixed nematic liquid crystals and a chiral nematic crystal was filled. The mixed nematic liquid crystals were made by mixing ethane-system and ester-system liquid crystals as a main part with biphenyl-system, pirymidine-system, and dioxane-system liquid crystals. The chiral nematic liquid crystal was 2-methylbutylcyanobiphenyl.

This liquid crystal panel was placed on a commercially available 650 W OHP and driven by a driving method as described with reference to FIGS. 3 to 5.

For example, when writing was conducted into an image plane of 120 × 80 lines at Vd = 25.8 V, imaging or displaying could be effected at a speed of 384 ms/image face, or a total of 64 ms for initialization and 4 ms × 80 lines for writing per image face. For partial revision, writing or displaying of each letter could be done at a speed of 92 ms/letter, or a total of 64 ms for initialization and 4 ms × 7 lines for writing per letter, assuming an alpha numeric letters constituted by 5 × 7 dots.

In projection display using the above liquid crystal panel and a screen spaced at a distance of about 2.5 m from the panel, an image having an effective image area of 9 cm × 6 cm formed in the liquid crystal panel was enlarged to an image having a size of about 120 cm × 80 cm on the screen. The projected image or display was as bright as that obtained by an OHP, in an office having ordinary brightness.

We claim:

1. A projection type liquid crystal display device, comprising:
    a liquid crystal panel, comprising:
        a first transparent substrate;
        a second transparent substrate substantially in parallel with the first transparent substrate;
        a spacer between the first and second transparent substrates, said first and second transparent substrates and said spacer forming an enclosed space, said first and second transparent substrates each having an internal surface facing the enclosed space;
        first transparent electrode means formed on the internal surface of said first transparent substrate;
        second transparent electrode means formed on the internal surface of said second transparent substrate;
        a cholesteric-nematic phase transition type liquid crystal with positive dielectric anisotropy, charged in the enclosed space;
        means for causing the liquid crystal at selected portions of the panel to be in a stable cholesteric phase and the liquid crystal at other portions of the panel to be in a stable nematic phase comprising (1) means for applying a voltage across the first and second electrodes sufficient to bring the liquid crystal in said panel to a stable nematic phase and (2) means for reducing the voltage applied across the first and second electrodes only at said selected portions of the panel to a level sufficiently low to bring the liquid crystal at said selected portions of the panel to a stable cholesteric phase; and means for driving the liquid crystal panel to form a liquid crystal image composed of bistable cholesteric and nematic phases of said cholesteric-nematic phase transition type liquid crystal by applying a voltage across said first and second transparent electrodes at a level that is below the level required to cause cholesteric to nematic phase change in said crystal and above the level required to cause nematic to cholesteric phase change in said crystal, said formed liquid crystal image being projectable onto a projection area by an optical system.

2. A remote communication system, comprising:
a projection type liquid crystal display device, comprising:
  a liquid crystal panel, comprising:
    a first transparent substrate;
    a second transparent substrate substantially in parallel with the first transparent substrate;
    a spacer between the first and second transparent substrates, said first and second transparent substrates and said spacer forming an enclosed space, said first and second transparent substrates each having an internal surface facing the enclosed space;
    first transparent electrode means formed on the internal surface of said first transparent substrate;
    second transparent electrode means formed on the internal surface of said second transparent substrate;
    a cholesteric-nematic phase transition type liquid crystal with positive dielectric anisotropy, charged in the enclosed space;
    means for causing the liquid crystal at selected portions of the panel to be in a stable cholesteric phase and the liquid crystal at other portions of the panel to be in a stable nematic phase comprising (1) means for applying a voltage across the first and second electrodes sufficient to bring the liquid crystal in said panel to a stable nematic phase and (2) means for reducing the voltage applied across the first and second electrodes only at said selected portions of the panel to a level sufficiently low to bring the liquid crystal at said selected portions of the panel to a stable cholesteric phase;
    means for driving the liquid crystal panel to form a liquid crystal image composed of bistable cholesteric and nematic phases of said cholesteric-nematic phase transition type liquid crystal by applying a voltage across said first and second transparent electrodes at a level that is below the level required to cause cholesteric to nematic phase change in said crystal and above the level required to cause nematic to cholesteric phase change in said crystal, said formed liquid crystal image being projectable onto a projection area by an optical system; and
  means for transferring data from a remote location to said liquid crystal panel driving means.

3. An electronic conference system enabling conferences between remote places, comprising:
communication means, located at each remote place, for communicating through at least one of telephone cables and radio systems; and
projection type liquid crystal display devices, operatively connected to said communication means, at least one liquid crystal display device being used for display in each remote place, each of said projection type liquid crystal display devices comprising:
  a liquid crystal panel, comprising:
    a first transparent substrate;
    a second transparent substrate substantially in parallel with the first transparent substrate;
    a spacer between the first and second transparent substrates, said first and second transparent substrates and said spacer forming an enclosed space, said first and second transparent substrates each having an internal surface facing the enclosed space;
    first transparent electrode means formed on the internal surface of said first transparent substrate;
    second transparent electrode means formed on the internal surface of said second transparent substrate;
    a cholesteric-nematic phase transition type liquid crystal with positive dielectric anisotropy, charged in the enclosed space;
    means for causing the liquid crystal at selected portions of the panel to be in a stable cholesteric phase and the liquid crystal at other portions of the panel to be in a stable nematic phase comprising (1) means for applying a voltage across the first and second electrodes sufficient to bring the liquid crystal in said panel to a stable nematic phase and (2) means for reducing the voltage applied across the first and second electrodes only at said selected portions of the panel to a level sufficiently low to bring the liquid crystal at said selected portions of the panel to a stable cholesteric phase; and
    means for driving the liquid crystal panel to form a liquid crystal image composed of bistable cholesteric and nematic phases of said cholesteric-nematic phase transition type liquid crystal by applying a voltage across said first and second transparent electrodes at a level that is below the level required to cause cholesteric to nematic phase change in said crystal and above the level required to cause nematic to cholesteric phase change in said crystal, said formed liquid crystal image being projectable onto a projection area by an optical system.

4. A display method using a liquid crystal panel containing signal and scanning electrodes and image elements formed of a cholesteric-nematic phase transition type liquid crystal with positive dielectric anisotropy charged in the enclosed space, the cholesteric-nematic phase transition type liquid crystal comprising a mixture of a nematic liquid crystal and a chiral nematic liquid crystal, having a high transparency nematic phase in a first stable optical state and a low transparency cholesteric phase in a second stable optical state and having an applied voltage-transparency hysteresis with an extended width, comprising the steps of:

(a) applying a first voltage across each signal electrode and each scanning electrode to place all of the liquid crystal panel into the first stable optical state;

(b) reducing the voltage applied to selected image elements in the liquid crystal panel where writing is to be conducted to below a second voltage for a predetermined period of time until the selected image elements enter the second stable optical state, while continuing to apply a voltage above the second voltage where writing is not to be conducted to maintain unselected image elements in the first stable optical state; and (c) applying a third voltage, approximately one-half the first voltage and greater than the second voltage, to all image elements after step (b) has been completed for all of the selected image elements.

* * * * *